(12) United States Patent
Nakano et al.

(10) Patent No.: US 8,420,738 B2
(45) Date of Patent: Apr. 16, 2013

(54) THERMOPLASTIC ELASTOMER COMPOSITION AND PRODUCTION PROCESS

(75) Inventors: Hiroaki Nakano, Kobe (JP); Hideyuki Okuyama, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 20 days.

(21) Appl. No.: 12/681,736

(22) PCT Filed: Oct. 2, 2008

(86) PCT No.: PCT/JP2008/067890
§ 371 (c)(1),
(2), (4) Date: May 14, 2010

(87) PCT Pub. No.: WO2009/044790
PCT Pub. Date: Apr. 9, 2009

(65) Prior Publication Data
US 2010/0267899 A1    Oct. 21, 2010

(30) Foreign Application Priority Data

Oct. 5, 2007  (JP) ................................ 2007-262005
Aug. 20, 2008  (JP) ................................ 2008-212170

(51) Int. Cl.
  C08L 47/00  (2006.01)
  C08L 23/36  (2006.01)
  C08L 23/22  (2006.01)
  C08L 25/10  (2006.01)
  C08J 3/24   (2006.01)

(52) U.S. Cl.
  USPC .............. 525/194; 525/95; 525/99; 525/195; 525/240; 525/241; 525/232; 525/332.5; 525/332.7; 525/375; 525/332.1; 524/576; 524/577; 524/578; 524/579; 524/580

(58) Field of Classification Search .................. 524/576, 524/577, 578, 579, 580; 525/95, 99, 194, 525/195, 240, 241, 232, 332.5, 332.7, 375, 525/332.1
See application file for complete search history.

(56) References Cited

U.S. PATENT DOCUMENTS

| | | | |
|---|---|---|---|
| 5,237,010 A | | 8/1993 | Tojo et al. |
| 5,736,605 A | * | 4/1998 | Oshima ........................ 524/521 |
| 5,747,557 A | * | 5/1998 | Hanyu et al. .................. 523/201 |
| 2003/0100696 A1 | | 5/2003 | Muraki |
| 2007/0112138 A1 | | 5/2007 | Noordermeer et al. |

FOREIGN PATENT DOCUMENTS

| | | |
|---|---|---|
| EP | 0250024 A1 | 12/1987 |
| EP | 0453262 A2 | 10/1991 |
| EP | 0 841 374 A2 | 5/1998 |
| EP | 841374 * | 5/1998 |
| EP | 1227126 * | 7/2002 |
| EP | 1227126 A1 | 7/2002 |
| JP | 64-24839 A | 1/1989 |
| JP | 4-59845 A | 2/1992 |
| JP | 8-112342 A | 5/1996 |
| JP | 3193895 B2 | 5/2001 |
| JP | 2002-201313 A | 7/2002 |
| JP | 2002-301133 A | 10/2002 |
| JP | 2003-147138 A | 5/2003 |
| JP | 2007-54621 A | 3/2007 |

* cited by examiner

*Primary Examiner* — Roberto Rabago
(74) *Attorney, Agent, or Firm* — Birch, Stewart, Kolasch & Birch, LLP

(57) ABSTRACT

A thermoplastic elastomer composition which has excellent cleanability and is suitable for use as a medical rubber supply. It is characterized by comprising a rubber ingredient dynamically crosslinked with a crosslinking agent and a matrix which comprises a thermoplastic resin and in which the crosslinked rubber ingredient has been dispersed, the crosslinking agent comprising a triazine derivative.

8 Claims, No Drawings

THERMOPLASTIC ELASTOMER COMPOSITION AND PRODUCTION PROCESS

TECHNICAL FIELD

The present invention relates to a thermoplastic elastomer composition excellent in cleanliness, a method for producing the composition, and medical rubber supplies consisting of the composition.

The medical rubber supplies are demanded to have high cleanliness. Specifically, as specified in the test method for an infusion rubber stopper of the Japanese Pharmacopoeia, it is requested that not less than a prescribed amount of various components is not detected when elution is carried out with pure water. The amount of an eluted material of zinc is specified in the Japanese Pharmacopoeia. Medical rubber supplies containing zinc are unpreferable.

As materials for the medical rubber supplies, general crosslinked rubber, a thermoplastic elastomer (TPE), and a thermoplastic elastomer to be dynamically crosslinked (TPV) have been developed. But each of them has a problem.

For example, the general rubber requires a crosslinking step so that it displays rubber elasticity. Normally the crosslinking step is performed to crosslink double bonds included in a rubber polymer. To this end, a crosslinking agent is added to the rubber polymer. As the crosslinking agent, sulfur or a thiuram compound has been hitherto used.

But normally the above-described crosslinking agents do not have a sufficient crosslinking effect. Normally in addition to the crosslinking agent, a crosslinking accelerator is used. As the crosslinking accelerator, zinc oxide is frequently used.

In using a composition containing a crosslinking substance as the medical rubber supplies, the mixing amount of the zinc oxide is forced to be limited to satisfy the standard of the eluting material test, which poses a problem that a sufficient crosslinking density cannot be obtained.

In addition to the crosslinking by using the sulfur or the like, as a normal rubber-crosslinking method, crosslinking by using peroxide, crosslinking by using metal, crosslinking by using resin is exemplified.

Of the above-described crosslinking, the crosslinking by using the peroxide has a problem that because a polymer is decomposed by the peroxide, a large number of organic substances are detected in the eluting material test. This decomposition is conspicuous in butyl rubber frequently used for the medical rubber supplies.

Because the crosslinking by using metal and the crosslinking by using resin require metal salts as a crosslinking auxiliary, the crosslinking by using metal and the crosslinking by using resin have a problem similar to the problem which occurs in the crosslinking by using sulfur.

In such a situation, in recent years, to put the thermoplastic elastomer (TPE) into practical use as the medical rubber supplies, the thermoplastic elastomer (TPE) is actively developed. That is, because the thermoplastic elastomer (TPE) does not require crosslinking, it is possible to avoid test results from being poor in the eluting material test derived from the crosslinking agent, the crosslinking accelerator, and the crosslinking auxiliary.

Further because a molding method similar to that used in molding the thermoplastic resin can be used for the thermoplastic elastomer (TPE), the thermoplastic elastomer is preferable from the standpoint of moldability. That is, because the thermoplastic elastomer does not require a finish step (for example, deburring, punching, and the like) necessary to be performed for a molding containing the crosslinked rubber or requires a small number of steps if any, the thermoplastic elastomer (TPE) is sanitary at a molding time. In addition it is easy to obtain an economic advantage in using the thermoplastic elastomer (TPE).

But the thermoplastic elastomer (TPE) does not have chemical crosslinked points. Thus the thermoplastic elastomer (TPE) has a problem that it is inferior in its heat resistance. A compression set of the thermoplastic elastomer (TPE) at a high temperature is much inferior to that of the chemically crosslinked rubber.

Because high pressure steam sterilization is used frequently in a sterile step of the medical rubber supplies, the thermoplastic elastomer (TPE) which has a large compression set and is liable to get out of shape in the high pressure steam sterile step is unpreferable as a material for the medical rubber supplies.

In the group of the thermoplastic elastomer (TPE), there is the thermoplastic elastomer to be dynamically crosslinked (TPV).

The thermoplastic elastomer to be dynamically crosslinked (TPV) means a complex in which a crosslinked rubber component is finely dispersed in the thermoplastic resin and a composition similar thereto.

Because this kind of the thermoplastic elastomer to be dynamically crosslinked (TPV) has chemical crosslinked points, the thermoplastic elastomer to be dynamically crosslinked (TPV) has a smaller compression set at a high temperature and a higher heat resistance than the thermoplastic elastomer (TPE) not having the chemical crosslinked points. Further because the thermoplastic elastomer to be dynamically crosslinked (TPV) is thermoplastic, as described above, the thermoplastic elastomer to be dynamically crosslinked (TPV) is more favorable than general crosslinked rubber from the standpoint of a hygiene aspect and productivity.

But the thermoplastic elastomer to be dynamically crosslinked (TPV) requires the crosslinking agent and the crosslinking auxiliary. Thus the thermoplastic elastomer to be dynamically crosslinked (TPV) has the same problem as the problem which occurs in the normal crosslinked rubber.

In the thermoplastic elastomer to be dynamically crosslinked (TPV), the crosslinked substance has excellent properties. Thus a peroxide crosslinking agent or a resin crosslinking agent is used by preference. But the crosslinking agent consisting of the peroxide may decompose a polymer component and thus gives an unpreferable influence in the eluting material test. As described above, the decomposition is conspicuous in the butyl rubber frequently used for the medical rubber supplies. Further together with the resin crosslinking agent, zinc oxide is used as the crosslinking auxiliary. Therefore the zinc oxide gives a bad influence in the eluting material test, and in addition the resin crosslinking agent which has remained owing to non-reaction also gives an unpreferable influence in the eluting material test. By decreasing the mixing amount of the zinc oxide or/and that of resin crosslinking agent, it is possible to satisfy the standard of the eluting material test. But in that case, insufficient crosslinking reaction takes place.

To solve the above-described problem, various investigations are made in various fields.

For example, in the general crosslinked rubber, to satisfy the standard regarding the elution of zinc, in Japanese Patent No. 3193895 (patent document 1), there is disclosed "A rubber stopper for a pharmaceutical container produced by vulcanizing 100 parts by weight of halogenated butyl rubber to which 5 to 25 parts by weight of fine powder of ultra-high-molecular-weight polyethylene is added with at least one kind of 2-substituted-4,6-dithiol-s-triazine derivatives or an organic peroxide in the absence of a zinc compound".

In the patent document 1, description is made that by using the fine powder of the ultra-high-molecular-weight polyethylene, it is possible to improve the adhesion of the surface of the rubber stopper for a pharmaceutical container which is generated owing to insufficient crosslinking of the halogenated butyl rubber caused by non-addition of the zinc compound thereto and give a reinforcing effect to the vulcanized substance.

The normal crosslinked rubber is described in the patent document 1, but the thermoplastic elastomer to be dynamically crosslinked is not disclosed therein.

That is, the rubber stopper for a pharmaceutical container disclosed in the patent document 1 is not capable of providing hygiene and economy displayed by the above-described thermoplastic elastomer.

Patent document 1: Japanese Patent No. 3193895

DISCLOSURE OF THE INVENTION

Problem to be Solved by the Invention

The present invention has been made in view of the above-described problem. Therefore it is an object of the present invention to provide a thermoplastic elastomer to be dynamically crosslinked (TPV) which is excellent in cleanliness.

Means for Solving the Problem

To solve the above-described problem, the present invention provides a thermoplastic elastomer composition in which a rubber component is dynamically crosslinked with a crosslinking agent and dispersed in a matrix containing at least a thermoplastic resin; and as the crosslinking agent, a triazine derivative is added to the rubber component.

As a material excellent in cleanliness and applicable to medical rubber supplies, the present inventors have paid attention to the thermoplastic elastomer to be dynamically crosslinked (TPV) which is excellent in its heat resistance and preferable from the standpoint of hygienic aspect and productivity.

To satisfy the standard, regarding the elution of zinc, imposed on the medical rubber supplies, it is conceivable that based on the invention described in the patent document 1, the rubber component is sufficiently crosslinked by adding fine powder of ultra-high-molecular-weight polyethylene to the thermoplastic elastomer to be crosslinked without adding a zinc compound serving as a crosslinking auxiliary thereto. But the flowability of the ultra-high-molecular-weight polyethylene is unfavorable as the thermoplastic resin. Thus it is unpreferable to add the ultra-high-molecular-weight polyethylene to the thermoplastic elastomer to be crosslinked from the standpoint of processability. It is economically unpreferable to add the ultra-high-molecular-weight polyethylene to the thermoplastic elastomer.

Accordingly the present inventors have investigated the crosslinking agent capable of sufficiently dynamically crosslinking the rubber component by trial and error, even though the amount of the zinc compound which is the crosslinking auxiliary is small to such an extent that the standard of the eluting material test is satisfied or even in the absence of the zinc compound. As a result, they have found that it is favorable to use the triazine derivative as the crosslinking agent and have made further investigations and completed the present invention.

As the triazine derivative to be used in the present invention, compounds expressed by a general formula (I) shown below are exemplified.

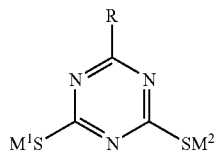

[Chemical Formula 1]

(In the formula, R denotes —SH, —OR$^1$, —SR$^2$, —NHR$^3$ or NR$^4$R$^5$ (R$^1$, R$^2$, R$^3$, R$^4$, and R$^5$ denote an alkyl group, an alkenyl group, an aryl group, an aralkyl group, an alkylaryl group or a cycloalkyl group. R$^4$, and R$^5$ may be identical to each other or different from each other.). M$^1$ and M$^2$ are identical to each other or different from each other and denote H, Na, Li, K, ½Mg, ½Ba, ½Ca, aliphatic primary, secondary or tertiary amines, quaternary ammonium salts or phosphonium salts.

In the general formula 1, as the alkyl group, those having 1 to 12 carbon atoms such as a methyl group, an ethyl group, an n-propyl group, an isopropyl group, an n-butyl group, an isobutyl group, a tert-butyl group, an n-pentyl group, an isopentyl group, a tert-pentyl group, an n-hexyl group, 1,1-dimethylpropyl group, an octyl group, an isooctyl group, a 2-ethylhexyl group, a decyl group, and a dodecyl group are listed.

As the alkenyl group, those having 1 to 12 carbon atoms such as a vinyl group, an aryl group, a 1-propenyl group, an isopropenyl group, a 2-butenyl group, a 1,3-butadienyl group, and a 2-pentenyl group are listed.

As the aryl group, monocyclic or condensed polycyclic aromatic hydrocarbon radicals are exemplified. Specifically aryl groups having 6 to 14 carbon atoms such as phenyl, naphthyl, anthryl, phenanthryl, and acenaphthylenyl are listed.

As the aralkyl group, those having 7 to 19 carbon atoms such as benzyl, phenethyl, diphenylmethyl, 1-naphthylmethyl, 2-naphthylmethyl, 2,2-diphenylmethyl, 3-phenylpropyl, 4-phenylbutyl, 5-phenylpentyl, 2-biphenylmethyl, 3-biphenylmethyl, and 4-biphenylmethyl are listed.

As the alkylaryl group, those having 7 to 19 carbon atoms such as tolyl, xyl, and octylphenyl are listed.

As the cycloalkyl group, those having 3 to 9 carbon atoms such as cyclopropyl, cyclobutyl, cyclopentyl, cyclohexyl, cycloheptyl, cyclooctyl, and cyclononyl are listed.

As examples of the triazine derivative shown by the general formula (I), 2,4,6-trimercapto-s-triazine, 2-methylamino-4,6-dimercapto-s-triazine, 2-(n-butylamino)-4,6-dimercapto-s-triazine, 2-octylamino-4,6-dimercapto-s-triazine, 2-propylamino-4,6-dimercapto-s-triazine, 2-diarylamino-4,6-dimercapto-s-triazine, 2-dimethylamino-4,6-dimercapto-s-triazine, 2-dibutylamino-4,6-dimercapto-s-triazine, 2-di(isobutylamino)-4,6-dimercapto-s-triazine, 2-dipropylamino-4,6-dimercapto-s-triazine, 2-di(2-ethylhexyl)amino-4,6-dimercapto-s-triazine, 2-dioleylamino-4,6-dimercapto-s-triazine, 2-laurylamino-4,6-dimercapto-s-triazine, 2-anilino-4,6-dimercapto-s-triazine, sodium salts of these triazine derivatives and disodium salts thereof are listed.

Above all, as the triazine derivative, the 2,4,6-trimercapto-s-triazine, the 2-dialkylamino-4,6-dimercapto-s-triazine, and the 2-anilino-4,6-dimercapto-s-triazine are preferable. The 2-dibutylamino-4,6-dimercapto-s-triazine is especially preferable because it is readily available.

In the present invention, as the triazine derivative, one kind of the above-described triazine derivatives may be used singly or not less than two kinds thereof may be used in combination.

It is favorable to use not less than 0.1 nor more than 10 parts by mass of the triazine derivative for 100 parts by mass of the rubber component. This is because when the mixing amount of the triazine derivative is less than 0.1 parts by mass, the rubber component is insufficiently crosslinked and thus adhesion appears or the wear resistance is inferior. On the other hand, when the mixing amount of the triazine derivative exceeds 10 parts by mass, there is a high possibility that owing to residue of the crosslinking agent, the thermoplastic elastomer composition is adversely affected in the eluting material test. The mixing amount of the triazine derivative is more favorably not less than 0.5 nor more than 7.5 parts by mass for 100 parts by mass of the rubber component.

The rubber component to be dynamically crosslinked is not limited to specific ones. Butyl rubber, isoprene rubber, butadiene rubber, styrene-butadiene rubber, natural rubber, chloroprene rubber, nitrile rubber such as acrylonitrile-butadiene rubber, hydrogenated nitrile rubber, norbornene rubber, ethylene propylene rubber, ethylene-propylene-diene rubber, acrylic rubber, ethylene acrylate rubber, fluorine rubber, chlorosulfonated polyethylene rubber, epichlorohydrin rubber, silicone rubber, urethane rubber, polysulfide rubber, phosphazene rubber, and 1,2-polybutadiene rubber are listed.

One kind of the above-described rubber components may be used singly or not less than two kinds thereof may be used in combination.

The rubber component is not limited to the above-described ones, but the butyl rubber or/and the ethylene-propylene-diene rubber (hereinafter referred to as EPDM rubber) are preferable.

The butyl rubber is preferable because it is excellent in its air permeability resistance and vapor permeability resistance.

As the butyl rubber, known compounds may be used. Isobutylene-isoprene copolymer rubber, halogenated isobutylene-isoprene copolymer rubber (hereinafter referred to as halogenated butyl rubber), and denatured substances thereof are exemplified. As the denatured substance, a bromide of an isobutylene and p-methylstyrene copolymer is exemplified. Of these butyl rubbers, the halogenated butyl rubber is favorable because it can be easily dynamically crosslinked. Chlorinated butyl rubber and brominated butyl rubber are more favorable.

The EPDM rubber is preferable because it is excellent in its processability. The EPDM rubber includes an oil-unextended type consisting of a rubber component and an oil-extended type containing the rubber component and extended oil. Both types can be used in the present invention. As examples of diene monomers of the EPDM rubber, dicyclopentadiene, methylene norbornene, ethylidene norbornene, 1,4-hexadiene, and cyclooctadiene are listed.

The halogenated butyl rubber and the EPDM rubber are compatible with each other. Thus the mixture of the two rubbers is excellent in its gas permeability resistance and vapor permeability resistance and processability.

The thermoplastic resin is not limited to specific ones, but known ones can be used. Olefin resin, polyester resin such as polyethylene terephthalate (PET) and polybutylene terephthalate (PBT), polystyrene (PS), nylon, and the like are exemplified. Above all, it is preferable to use the olefin resin because the olefin resin is compatible with the above-described rubber components.

As the olefin resin, polyethylene, polypropylene, ethylene ethyl acrylate resin, ethylene vinyl acetate resin, ethylene-methacrylate resin, ionomer resin, and chlorinated polyethylene are listed. Of these olefin resins, it is favorable to use the polypropylene or the polyethylene.

It is more favorable to use the polypropylene. This is because the polypropylene is more flowable than the polyethylene and is thus excellent in its processability and in addition higher than the polyethylene in its melting point. Thus the thermoplastic elastomer composition of the present invention has an improved compression set at a high temperature.

The mixing amount of the thermoplastic resin is not limited to a specific one, but it is favorable to set the mixing amount of the thermoplastic resin to not less than 10 parts by mass nor more than 80 parts by mass for 100 parts by mass of the rubber component. When the mixing amount of the thermoplastic resin is less than 10 parts by mass for 100 parts by mass of the rubber component, the flowability of the composition is unfavorable and thus difficulties arise in dynamically crosslinking the rubber component. On the other hand, when the mixing amount of the thermoplastic resin is set to more than 80 parts by mass for 100 parts by mass of the rubber component, preferable rubber elasticity cannot be obtained. The mixing amount of the thermoplastic resin is set to more favorably not less than 30 parts by mass nor more than 70 parts by mass for 100 parts by mass of the rubber component.

The thermoplastic elastomer composition of the present invention may contain a thermoplastic elastomer. That is, the mixture of the thermoplastic resin and the thermoplastic elastomer may be used as the matrix in which the dynamically crosslinked rubber component is dispersed.

The thermoplastic elastomer is not limited to specific ones, but known thermoplastic elastomers can be used. Specifically a styrene thermoplastic elastomer, a vinyl chloride thermoplastic elastomer, an olefin thermoplastic elastomer, a urethane thermoplastic elastomer, an ester thermoplastic elastomer, and an amide thermoplastic elastomer are listed. Of these thermoplastic elastomers, it is preferable to use the styrene thermoplastic elastomer.

As the styrene thermoplastic elastomer, it is possible to exemplify a block copolymer of a polymer block (A) containing a styrene monomer as its main component and a block (B) containing a conjugated diene compound as its main component and a substance in which conjugated diene polymerization unit of the above-described block copolymer is hydrogenated.

As the styrene monomer, styrene, α-methylstyrene, vinyl toluene, and t-butylstyrene are listed. Only one kind of these monomers may be used or not less than two kinds thereof may be used in combination. Of these styrene monomers, the styrene is preferable.

As the conjugated diene compound, butadiene, isoprene, chloroprene, and 2,3-dimethylbutadiene are listed. Only one kind of these conjugated diene compounds may be used or not less than two kinds thereof may be used in combination.

Of the above-described styrene thermoplastic elastomers, it is more favorable to use a hydrogenated styrene thermoplastic elastomer. This is because the double bonds of the hydrogenated styrene thermoplastic elastomer are saturated by hydrogenation, has a low hardness and a small compression set, and is excellent in its weather resistance and durability. It is more favorable to use the hydrogenated styrene thermoplastic elastomer because it does not inhibit the dynamic crosslinking of the rubber component and allows the elastomer composition to display desired plasticity after the dynamic crosslinking finishes. In addition, by containing the thermoplastic elastomer having a favorable flowability in the thermoplastic elastomer composition, it is possible to maintain the flowability of the thermoplastic elastomer composition and decrease the mixing amount of the thermoplastic resin.

As the styrene thermoplastic elastomer, a styrene-butadiene-styrene copolymer (SBS), a styrene-isoprene-styrene copolymer (SIS), a styrene-ethylene/butylene-styrene copolymer (SEBS), a styrene-ethylene/propylene-styrene copolymer (SEPS), and a styrene-ethylene-ethylene/propylene-styrene copolymer (SEEPS) are listed.

Of these styrene thermoplastic elastomers, it is especially preferable to use the styrene-ethylene-ethylene/propylene-styrene copolymer (SEEPS).

When the thermoplastic elastomer is used for the thermoplastic elastomer composition, the mixing amount of the thermoplastic elastomer is favorably not more than 300 parts by mass for 100 parts by mass of the rubber component. When the mixing amount of the thermoplastic elastomer is more than 300 parts by mass for 100 parts by mass of the rubber component, a small compression set of the thermoplastic elastomer to be dynamically crosslinked (TPV) cannot be displayed at a high temperature. The mixing amount of the thermoplastic elastomer is favorably not more than 150 parts by mass and more favorably not more than 100 parts by mass for 100 parts by mass of the rubber component.

The mixing ratio between the thermoplastic elastomer and the thermoplastic resin can be determined according to the kind of the elastomer and the resin to be used. It is favorable to set the mixing amount of the thermoplastic elastomer to not more than 1000 parts by mass for 100 parts by mass of the thermoplastic resin. When the mixing amount of the thermoplastic elastomer is more than 1000 parts by mass for 100 parts by mass of the thermoplastic resin, the flowability of the composition is unfavorable, which gives an unfavorable influence in molding the composition. The mixing amount of the thermoplastic elastomer for 100 parts by mass of the thermoplastic resin is set to favorably not more than 500 parts by mass and more favorably not more than 300 parts by mass.

Because the thermoplastic elastomer composition of the present invention contains the triazine derivative as the crosslinking agent, the rubber component can be sufficiently dynamically crosslinked in the absence of the zinc compound which is the crosslinking auxiliary. But when the amount of the zinc compound is small to such an extent that the zinc compound satisfies the standard of the eluting material test, the zinc compound may be used for the thermoplastic elastomer composition. For example, when one to three parts by mass of zinc oxide is used for 100 parts by mass of the rubber component, the amount of the eluted material of zinc is 0.00 ppm which is not more than the detection limit value and thus satisfies the requirement of the eluting material test.

The thermoplastic elastomer composition of the present invention may contain other components, unless the use thereof is contrary to the object of the present invention.

To properly make a crosslinking reaction, a known crosslinking auxiliary may be used for the thermoplastic elastomer composition of the present invention. As the crosslinking auxiliary, metal oxides are exemplified. From the standpoint of cleanliness, oxides of magnesium and those of calcium are preferable. The mixing amount of the crosslinking auxiliary is so set that the property of the rubber component is displayed sufficiently. In the present invention, the mixing amount of the crosslinking auxiliary can be selected from the range of 0 to five parts by mass for 100 parts by mass of the rubber component.

An acid-accepting agent may be used for the thermoplastic elastomer composition. By using the acid-accepting agent for the thermoplastic elastomer composition, it is possible to prevent a halogen gas generated when the rubber component is dynamically crosslinked from remaining.

As the acid-accepting agent, it is possible to use various substances acting as an acid acceptor. As the acid-accepting agent, carbonates of magnesium and calcium are listed as preferable examples. It is also possible to use hydrotalcites and magnesium oxide.

The mixing amount of the acid-accepting agent is set to favorably not less than 0.1 nor more than 10 parts by mass and more favorably not less than 0.5 nor more than 5 parts by mass for 100 parts by mass of the rubber component.

To provide the thermoplastic elastomer composition with a moderate degree of flexibility and elasticity, softeners can be used as necessary for the thermoplastic elastomer composition.

As the softener, oil and a plasticizer are listed. As the oil, it is possible to use mineral oil such as paraffin oil, naphthenic oil, aromatic oil and known synthetic oil consisting of a hydrocarbon oligomer, and process oil. As the synthetic oil, an oligomer of $\alpha$-olefin, an oligomer of butene, and an amorphous oligomer of ethylene and $\alpha$-olefin are preferable. As the plasticizer, phthalate-based, adipate-based, sebacate-based, phosphate-based, polyether-based, and polyester-based plasticizers are listed. More specifically dioctyl phthalate (DOP), dibutyl phthalate (DBP), dioctyl sebacate (DOS), and dioctyl adipate (DOA) are listed.

The mixing amount of the softener is set to favorably not more than 600 parts by mass and more favorably not more than 400 parts by mass for 100 parts by mass of the rubber component. When the mixing amount of the softener is more than the above-described range, the softener may bleed from the surface of the thermoplastic elastomer composition or may inhibit crosslinking and thus the rubber component is insufficiently crosslinked. Thereby the property of the thermoplastic elastomer composition deteriorates. The lower limit of the mixing amount of the softener is not limited to a specific mixing amount, but should be so set as to obtain the effect to be obtained by the addition of the softener to the rubber component, namely, the effect of improving the dispersibility of the rubber component at a dynamic crosslinking time. Normally the mixing amount of the softener is not less than 15 parts by mass.

When oil-extended epichlorohydrin rubber or an oil-extended hydrogenated styrene thermoplastic elastomer is used, extended oil plays a role as the softener. Therefore the amount of the extended oil is regarded as the mixing amount of the softener.

To improve the mechanical strength of the thermoplastic elastomer composition, a filler can be used therefor as necessary.

As the filler, it is possible to list powder of silica, carbon black, clay, talc, calcium carbonate, titanium oxide, dibasic phosphite (DLP), basic magnesium carbonate, alumina, and the like.

It is preferable that the mixing amount of the filler is not more than 30 parts by weight for 100 parts by weight of the rubber component. When the ratio of the filler exceeds the above-described range, the flexibility of the thermoplastic elastomer composition may deteriorate. In addition from the standpoint of cleanliness, it is unpreferable that the ratio of the filler exceeds the above-described range.

In addition, the thermoplastic elastomer composition may appropriately contain additives such as a lubricant, an age resistor, an antioxidant, an ultraviolet ray absorber, a pigment, an antistatic agent, a fire retarding agent, a neutralizing agent, a nucleating agent, an anti-foam agent, and the like.

As the lubricant, higher fatty amide, unsaturated fatty amide, and the like are exemplified.

As the age resistor, imidazoles such as 2-mercaptobenzimidazole; amines such as phenyl-α-naphthylamine, N,N'-di-6-naphthyl-p-phenylenediamine, and N-phenyl-N'-isopropyl-p-phenylenediamine; and phenols such as 2-6-di-tert-butyl-4-methylphenol, 2,2'-methylenebis(4-methyl-6-tert-butylphenol), and 2,5-di-tert-butylhydroquinone are listed.

Because the thermoplastic elastomer composition of the present invention composed of the above-described components is excellent in cleanliness, the thermoplastic elastomer composition can be very effectively applied to medical rubber supplies, rubber supplies for food, and rubber supplies for chemicals. As the medical rubber supplies, a rubber stopper of a pharmaceutical container, a gasket for a syringe, a sealing material or a packing material for a decompression blood collection tube are listed. As the rubber supplies for food, various sealing materials for use in food-producing apparatuses and containers for storing and/or accommodating food are listed.

The present invention provides a method for producing the thermoplastic elastomer composition in which the rubber component, the triazine derivative, and the matrix containing at least the thermoplastic resin are mixed with one another and kneaded; the kneaded components are supplied to an extruder or a kneader; and the rubber component is dispersed by applying a shearing force to the kneaded components, dynamically crosslinked with the triazine derivative, and dispersed in the matrix.

Alternatively it is possible to use a small amount of the zinc compound for the thermoplastic elastomer composition to such an extent that the standard of the eluting material test is satisfied and mix the zinc compound, the rubber component, the triazine derivative, and the matrix containing at least the thermoplastic resin with one another and knead these components.

More specifically, the rubber component, the triazine derivative, the thermoplastic resin, the thermoplastic elastomer as desired, and other additives are supplied to a kneader such as a Henschel mixer, a super mixer, a tumbler-type mixer or the like and kneaded. At that time, the zinc compound is not used or a small amount of the zinc compound is used to such an extent that the standard of the eluting material test is satisfied. It is possible to knead all of the components or knead a part of all of the components in advance, add remaining components to the kneaded components, and knead all of the components.

After the kneaded components are supplied to a uniaxial extruder or a twin screw extruder, the rubber component is dynamically crosslinked with the triazine derivative which is the crosslinking agent with the kneaded components being heated to 150 to 250° C. and thereafter dispersed in the matrix containing at least the thermoplastic resin.

By crosslinking the rubber component with a shearing force being applied to the thermoplastic elastomer composition, it is possible to set the diameters of rubber particles in the thermoplastic elastomer composition to several micrometers to several tens of micrometers and finely disperse the rubber component in the matrix. By finely dispersing the rubber component in the matrix, the adhesion of the surface of the molding of thermoplastic elastomer composition is improved. This effect is noticeable when the butyl rubber having a high adhesion is used as the rubber component. But other rubber components are also effective for improving the adhesion of the surface of the molding. Because this effect is not affected by the kind of the thermoplastic resin composing the matrix, it is possible to select the thermoplastic resin by laying stress on other properties of the thermoplastic elastomer composition, for example, processability. Therefore it is possible to select the general-purpose thermoplastic resin economically advantageous and inexpensive.

It is preferable to dynamically crosslink the rubber component in the presence of halogen such as chlorine, bromine, fluorine or iodine.

To allow the halogen to be present at a dynamic crosslinking time, it is favorable to use a halogenated rubber component or a halogen-donating substance. As the halogen-donating substance, tin chloride such as stannic chloride, ferric oxide, and cupric chloride are listed. One kind of the halogen-donating substances may be used singly or not less than two kinds thereof may be used in combination.

It is preferable to pelletize the thermoplastic elastomer composition obtained by carrying out the above-described method to facilitate processing to be performed at subsequent steps. Thereby it is possible to obtain preferable moldability.

Effect of the Invention

As described above, the zinc compound is not used for the thermoplastic elastomer composition of the present invention. Even though the zinc compound is used therefor, a small amount of the zinc compound is used therefor in dynamically crosslinking the rubber component with the triazine derivative. Thus the elution of zinc is prevented or the zinc is prevented from eluting beyond the standard specified in the eluting material test. Because the thermoplastic elastomer composition does not pollute substances which contact it, the molding of the thermoplastic elastomer composition is excellent in cleanliness. Therefore the medical rubber supplies consisting of the thermoplastic elastomer composition of the present invention are capable of satisfying the standard of the eluting material test specified in the test method of the Japanese Pharmacopoeia for an infusion rubber stopper.

Further in the thermoplastic elastomer composition of the present invention, the rubber component is dynamically crosslinked and has chemical crosslinked points. Thus the thermoplastic elastomer composition has a small compression set at a high temperature and is excellent in its heat resistance. Thereby when the medical rubber supplies of the present invention are sterilized by using high pressure steam, the medical rubber supplies do not get out of shape and are thus very practical.

Further in the thermoplastic elastomer composition of the present invention, by using the triazine derivative as the crosslinking agent, it is possible to sufficiently crosslink the rubber component without adding the zinc compound thereto. Furthermore because the rubber component is finely dispersed in the composition, the adhesion of the surface of the molding can be improved.

Because the thermoplastic elastomer composition of the present invention can be formed by using a molding method similar to that used to mold the thermoplastic resin, the thermoplastic elastomer composition is excellent in its moldability. Further because a finish step (for example, deburring, punching, and the like) of the molding does not necessarily have to be performed after the rubber component is dynamically crosslinked, the thermoplastic elastomer composition can be molded sanitarily and allows an economic advantage to be easily obtained. In addition, because an expensive material such as fine powder of ultra-high-molecular-weight polyethylene is not an essential component of the thermoplastic elastomer composition of the present invention, the thermoplastic elastomer composition can be produced at a low cost.

BEST MODE FOR CARRYING OUT THE INVENTION

An embodiment of the thermoplastic elastomer composition of the present invention is described below.

The thermoplastic elastomer composition of a first embodiment is characterized in that halogenated butyl rubber thereof is dynamically crosslinked with a crosslinking agent consisting of a triazine derivative and dispersed in a matrix consisting of a mixture of an olefin resin and a styrene thermoplastic elastomer and that the thermoplastic elastomer composition does not contain a zinc compound.

It is preferable to use polypropylene as the olefin resin and a styrene-ethylene-ethylene/propylene-styrene copolymer (SEEPS) as the styrene thermoplastic elastomer.

The mixing amount of the olefin resin is favorably not less than 30 nor more than 70 parts by mass for 100 parts by mass of the rubber component. The mixing amount of the styrene thermoplastic elastomer is favorably not more than 100 for 100 parts by mass of the rubber component. Regarding the mixing ratio between the styrene thermoplastic elastomer and the olefin resin, it is preferable to use not more than 300 parts by mass of the styrene thermoplastic elastomer for 100 parts by mass of the olefin resin.

As the triazine derivative, 2-dibutylamino-4,6-dimercapto-s-triazine is used.

It is preferable to use the triazine derivative at a ratio of not less than 0.5 nor more than 7.5 parts by mass for 100 parts by mass of the rubber component.

The thermoplastic elastomer composition may contain an additive other than the above-described components.

As the additive, it is preferable to use an acid-accepting agent. As the acid-accepting agent, it is preferable to use magnesium oxide.

The mixing amount of the acid-accepting agent is preferably not less than 0.5 nor more than three parts by mass for 100 parts by mass of the rubber component.

The thermoplastic elastomer composition is produced by a method described below.

The triazine derivative, the halogenated butyl rubber, the styrene thermoplastic elastomer, the olefin resin, the acid-accepting agent are supplied to a kneading machine such as a Henschel mixer, a super mixer, a tumbler-type mixer or the like and kneaded.

After the kneaded components are supplied to a uniaxial extruder or a twin screw extruder, the halogenated butyl rubber is dynamically crosslinked with the triazine derivative with the kneaded components being heated to 180 to 200° C. in the absence of the zinc compound and dispersed in the matrix consisting of the mixture of the styrene thermoplastic elastomer and the olefin resin.

It is possible to form the thermoplastic elastomer composition of the first embodiment obtained in the above-described method into moldings according to various uses by using a known method. Because the molding consisting of the thermoplastic elastomer composition of the present invention satisfies the standard of the eluting material test specified in the test method for an infusion rubber stopper of the Japanese Pharmacopoeia, the thermoplastic elastomer composition can be suitably used as medical rubber supplies.

Medical rubber products consisting of the thermoplastic elastomer composition has favorably 20 to 70 and more favorably 40 to 60 in the Shore A Hardness of JIS K6262.

The compression set of the medical rubber supplies is favorably not more than 40% and more favorably not more than 25%.

The medical rubber supplies are so produced that the number of times of adhesion thereof is not more than one time, when an adhesion test described later in the examples of the present invention is conducted.

The thermoplastic elastomer composition of a second embodiment is different from that of the first embodiment in that the thermoplastic elastomer composition of the second embodiment contains a small amount of zinc oxide, but other components of the thermoplastic elastomer composition of the second embodiment and the producing method used in the second embodiment are similar to those of the first embodiment.

the zinc compound, zinc oxide is used. The thermoplastic elastomer composition contains the zinc oxide at one to three parts by mass for 100 parts by mass of the rubber component.

By using a small mixing amount of the zinc compound, it is possible to limit the amount of an eluted material of the zinc compound to not more than the detection limit value and satisfy the standard of the eluting material test.

Examples of the present invention and comparison examples are described in detail below.

Dynamically crosslinked thermoplastic elastomer composition of each of the examples and the comparison examples was formed by using components shown in table 1. A medical rubber stopper of each of the examples and the comparison examples was produced by using the obtained thermoplastic elastomer composition.

TABLE 1

| Components used and mixing ratio | | | Example 1 | Example 2 | Example 3 | Comparison example 1 | Comparison example 2 |
|---|---|---|---|---|---|---|---|
| Rubber component | | | 100 | 100 | 100 | 100 | 100 |
| Thermoplastic resin | | | 40 | 60 | 60 | 40 | 40 |
| Hydrogenated styrene thermoplastic elastomer | | | 30 | 40 | 40 | 30 | 30 |
| Plasticizer | | | 40 | 80 | 40 | 40 | 40 |
| Triazine | | | 2 | 2 | 2 | | |
| Acid-accepting agent | | | 1 | 1 | 1 | 1 | 1 |
| Resin crosslinking agent | | | | | | 12 | 12 |
| Zinc oxide | | | | | 3 | 7 | |
| Hardness (type A durometer hardness) | | | 50 | 46 | 50 | 50 | 51 |
| Compression set | | | 22 | 26 | 20 | 22 | 49 |
| Eluting material test | Item | Standard value | | | | | |
| | Properties | Colorless | Colorless | Colorless | Colorless | Colorless | Colorless |
| | Permeability 430 nm (%) | Not less than 99.0 | 99.7 | 99.7 | 99.7 | 99.7 | 99.6 |

TABLE 1-continued

| Components used and mixing ratio | | | Example 1 | Example 2 | Example 3 | Comparison example 1 | Comparison example 2 |
|---|---|---|---|---|---|---|---|
| | Permeability 650 nm (%) | Not less than 99.0 | 99.9 | 99.9 | 99.9 | 99.8 | 99.6 |
| | Bubbling | Disappeared within 3 minutes | Disappeared within 3 minutes | Disappeared within 3 minutes | Disappeared within 3 minutes | Disappeared within 3 minutes | Disappeared within 3 minutes |
| | pH | Within ±1.0 | −0.15 | −0.13 | −0.15 | −0.13 | −0.15 |
| | Zinc (ppm) | Not more than 1.0 | 0.00 | 0.00 | 0.00 | 0.03 | 0.00 |
| | $KMnO_4$ reducing substance (mL) | Not more than 2.0 | 0.56 | 0.48 | 0.57 | 0.83 | 0.98 |
| | UV absorption spectra | Not more than 0.2 | 0.03 | 0.02 | 0.03 | 0.03 | 0.05 |
| Adhesion test | | | 1 | 0 | 0 | 1 | 5 |

Materials used are as shown below.
Rubber component: halogenated butyl rubber ("butyl 1066" produced by Exxon Mobil Corporation)
Thermoplastic resin: polypropylene resin ("BC6" produced by Nippon Polychemicals Co., Ltd.)
Thermoplastic elastomer: halogenated styrene thermoplastic elastomer ("SEPTON 4077" produced by Kuraray Co., Ltd.)
Softener: paraffinic process oil ("Diana process oil PW-380" produced by Idemitsu Kosan Co., Ltd.)
Triazine derivative: 2-di-n-butylamino-4,6-dimercapto-s-triazine ("Jisnet DB" produced by Sankyo Kasei Co., Ltd.)
Acid-accepting agent: magnesium oxide ("Kyowamag 150" produced by Kyowa Chemical Industry Co., Ltd.)
Resin crosslinking agent: halogenated alkylphenol resin crosslinking agent ("Tackirol 250-III" produced by Taoka Chemical Co., Ltd.)
Zinc oxide: two kinds of zinc oxide (produced by Nippon Coke & Engineering Co., Ltd.)

The producing method is as described below.

After the components shown in table 1 were used at the ratio shown in table 1 and mixed with one another by using a tumbler, the components were kneaded with a twin screw extruder ("HTM38" produced by Aibeck Co., Ltd.) at a speed of 200 rpm with the components being heated to 180 to 200° C. Thereafter the rubber component was dynamically crosslinked. In this manner, the thermoplastic elastomer composition of each of the examples and the comparison examples was prepared and pelletized.

Each of the obtained pellets was injection-molded at 190 to 220° C. by using a 50t injection molding machine (produced by Sumitomo Heavy Industries, Ltd.) to produce the medical rubber stopper and the specimen of each of the examples and the comparison examples.

Various evaluations were made on the medical rubber stoppers of the examples and the comparison examples by carrying out methods described below. Results of the evaluations are shown in table 1.

Hardness

In accordance with JIS K 6253, a type A durometer hardness test was conducted in a constant temperature and humidity condition where an ambient temperature was 23° C. and a relative humidity was 55%.

Compression Set

In accordance with JIS K6262, the compression set was measured at a measuring temperature of 70° C. and a compressibility of 25% for a measuring period of time of 24 hours.

Eluting Material Test

In accordance with the test method for an infusion rubber stopper of the Japanese Pharmacopoeia, an eluting material test was conducted. The value of "0.00" shown in the item of "zinc" in table 1 indicates that the amount of an eluted material of zinc is not more than the detection limit value.

Adhesion Test

The medical rubber stopper was put on the mouth of a glass bottle. An iron plate having a smooth surface was pressed from above against the medical rubber stopper at 0.5N for 10 minutes. Thereafter the iron plate was pulled up quietly. Rubber stoppers which adhered to the iron plate and caused the glass bottle to move as the iron plate was moved upward were regarded as "adhesive", whereas rubber stoppers which did not cause the glass bottle to move were regarded as "non-adhesive".

The above-described operation was performed nine times in the test. The number of times in which the rubber stopper adhered to the iron plate is shown in table 1.

All of the medical rubber stoppers of the examples 1, 2 which did not contain the zinc oxide and that of the example 3 which contained a small amount of the zinc oxide had 0.00 which indicates that the amount of the eluted material is not more than the detection limit value specified in the eluting material test regarding zinc and thus satisfied the standard of the eluting material test. In the adhesion test, the medical rubber stoppers of the examples 1, 2, and 3 had preferable results similar to that of the medical rubber stopper of the comparison example 1 containing the rubber component dynamically crosslinked by using a conventional method.

The medical rubber stopper of the comparison example 1 consisted of the thermoplastic elastomer composition in which the general-purpose resin crosslinking agent was added to the rubber component at seven parts by mass for 100 parts by mass of the rubber component to dynamically crosslink the rubber component. Preferable properties were obtained as a whole, but zinc was detected in the eluting material test regarding zinc.

In the medical rubber stopper of the comparison example 2, the rubber component was dynamically crosslinked with the resin crosslinking agent in the absence of the zinc compound. Because the rubber component was insufficiently crosslinked, the properties of the thermoplastic elastomer composition were unpreferable, and fine dispersion of the rubber component was insufficient. Thus adhesion appeared on the surface of the thermoplastic elastomer composition.

INDUSTRIAL APPLICABILITY

As the medical rubber supplies consisting of the thermoplastic elastomer composition of the present invention, a medical rubber stopper for a vial, a gasket for a syringe, a gasket for a prefilled syringe, a sealing member for medical equipment are listed.

What is claimed is:

1. A thermoplastic elastomer composition comprising a rubber component consisting of ethylene-propylene-diene rubber or/and butyl rubber; a crosslinking agent comprising a triazine derivative; 30 to 70 parts by mass of polypropylene or polyethylene for 100 parts by mass of the rubber component; at least 15 parts by mass of a softener for 100 parts by mass of the rubber component; and 30 to 40 parts by mass of hydrogenated styrene thermoplastic elastomer for 100 parts by mass of the rubber component, wherein said rubber component is dynamically crosslinked with said triazine derivative and dispersed in said polypropylene or said polyethylene, and wherein the triazine derivative is a compound of the following formula:

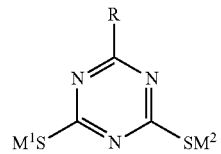

wherein R denotes —SH, —OR$^1$, —SR$^2$, —NHR$^3$ or NR$^4$R$^5$, with R$^1$, R$^2$, R$^3$, R$^4$, and R$^5$ each denoting a C$_1$-C$_{12}$ alkyl group, a C$_1$-C$_{12}$ alkenyl group, a C$_6$-C$_{14}$ aryl group, a C$_7$-C$_{19}$ aralkyl group, a C$_7$-C$_{19}$ alkylaryl group or a C$_3$-C$_9$ cycloalkyl group, and with R$^4$ and R$^5$ being identical to each other or different from each other; and M$^1$ and M$^2$ are identical to each other or different from each other and denote H, Na, Li, K, ½Mg, ½Ba, ½Ca, an aliphatic primary amine, an aliphatic secondary amine, an aliphatic tertiary amine, a quaternary ammonium salt or a phosphonium salt.

2. A thermoplastic elastomer composition according to claim 1, which does not contain a zinc compound.

3. A thermoplastic elastomer composition according to claim 1 or 2, wherein said crosslinking agent consisting of said triazine derivative is added to said rubber component at not less than 0.1 parts by mass nor more than 10 parts by mass for 100 parts by mass of said rubber component.

4. A method for producing a thermoplastic elastomer composition which comprises: mixing a rubber component consisting of ethylene-propylene-diene rubber or/and butyl rubber, a triazine derivative, 30 to 70 parts by mass of a polypropylene or polyethylene for 100 parts by mass of the rubber component, at least 15 parts by mass of a softener for 100 parts by mass of the rubber component, and 30 to 40 parts by mass of hydrogenated styrene thermoplastic elastomer for 100 parts by mass of the rubber component to form a mixture; and supplying the mixture to an extruder or a kneader for extrusion or kneading; wherein said rubber component is dispersed by applying a shearing force to said mixture, dynamically crosslinked with said triazine derivative, and dispersed in said polypropylene or said polyethylene, and wherein the triazine derivative is a compound of the following formula:

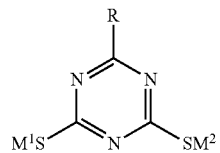

wherein R denotes —SH, —OR$^1$, —SR$^2$, —NHR$^3$ or NR$^4$R$^5$, with R$^1$, R$^2$, R$^3$, R$^4$, and R$^5$ each denoting a C$_1$-C$_{12}$ alkyl group, a C$_1$-C$_{12}$ alkenyl group, a C$_6$-C$_{14}$ aryl group, a C$_7$-C$_{19}$ aralkyl group, a C$_7$-C$_{19}$ alkylaryl group or a C$_3$-C$_9$ cycloalkyl group, and with R$^4$ and R$^5$ being identical to each other or different from each other; and M$^1$ and M$^2$ are identical to each other or different from each other and denote H, Na, Li, K, ½Mg, ½Ba, ½Ca, an aliphatic primary amine, an aliphatic secondary amine, an aliphatic tertiary amine, a quaternary ammonium salt or a phosphonium salt.

5. A medical rubber supply component consisting of a thermoplastic elastomer composition as defined in claim 1.

6. A medical rubber supply component consisting of a thermoplastic elastomer composition produced by using a method as defined in claim 4.

7. A thermoplastic elastomer composition according to claim 3, wherein the softener is an oil or a plasticizer that is present in an amount of not more than 400 parts by mass and not less than 15 parts by mass for 100 parts by mass of the rubber component; and the triazine is a compound of the following formula:

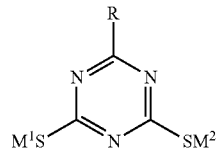

wherein R denotes —SH, —OR$^1$, —SR$^2$, —NHR$^3$ or NR$^4$R$^5$, with R$^1$, R$^2$, R$^3$, R$^4$, and R$^5$ each denoting a C$_1$-C$_{12}$ alkyl group, a C$_1$-C$_{12}$ alkenyl group, a C$_6$-C$_{14}$ aryl group, a C$_7$-C$_{19}$ aralkyl group, a C$_7$-C$_{19}$ alkylaryl group or a C$_3$-C$_9$ cycloalkyl group, and with R$^4$ and R$^5$ being identical to each other or different from each other; and M$^1$ and M$^2$ are identical to each other or different from each other and denote H, Na, Li, K, ½Mg, ½Ba, ½Ca, an aliphatic primary amine, an aliphatic secondary amine, an aliphatic tertiary amine, a quaternary ammonium salt or a phosphonium salt.

8. A thermoplastic elastomer composition according to claim 7, wherein the triazine is selected from the group consisting of 2,4,6-trimercapto-s-triazine, 2-methylamino-4,6-dimercapto-s-triazine, 2-(n-butylamino)-4,6-dimercapto-s-triazine, 2-octylamino-4,6-dimercapto-s-triazine, 2-propylamino-4,6-dimercapto-s-triazine, 2-diarylamino-4,6-dimercapto-s-triazine, 2-dimethylamino-4,6-dimercapto-s-triazine, 2-dibutylamino-4,6-dimercapto-s-triazine, 2-di(iso-butylamino)-4,6-dimercapto-s-triazine, 2-dipropylamino-4,6-dimercapto-s-triazine, 2-di(2-ethylhexyl)amino-4,6-dimercapto-s-triazine, 2-dioleylamino-4,6-dimercapto-s-triazine, 2-laurylamino-4,6-dimercapto-s-triazine, and 2-anilino-4,6-dimercapto-s-triazine, as well as sodium and disodium salts thereof.

* * * * *